(12) United States Patent
Soellner

(10) Patent No.: US 11,401,058 B2
(45) Date of Patent: Aug. 2, 2022

(54) METHOD AND DEVICE FOR CAPPING CONTAINERS WITH CONTAINER CAPS

(71) Applicant: KRONES AG, Neutraubling (DE)

(72) Inventor: Juergen Soellner, Neutraubling (DE)

(73) Assignee: KRONES AG, Neutraubling (DE)

( * ) Notice: Subject to any disclaimer, the term of this patent is extended or adjusted under 35 U.S.C. 154(b) by 83 days.

(21) Appl. No.: 16/838,239

(22) Filed: Apr. 2, 2020

(65) Prior Publication Data
US 2020/0317377 A1 Oct. 8, 2020

(30) Foreign Application Priority Data

Apr. 3, 2019 (DE) ...................... 10 2019 108 683.3

(51) Int. Cl.
| B65B 7/01 | (2006.01) |
| B65B 7/28 | (2006.01) |
| B67C 7/00 | (2006.01) |
| B29C 49/46 | (2006.01) |

(52) U.S. Cl.
CPC .............. *B65B 7/01* (2013.01); *B65B 7/2842* (2013.01); *B67C 7/0073* (2013.01); *B29C 2049/4697* (2013.01); *B65B 2210/06* (2013.01); *B67B 2201/08* (2013.01)

(58) Field of Classification Search
CPC ....... B65B 7/01; B65B 7/2842; B65B 55/025; B65B 2210/06; B67B 3/003; B67B 3/2013; B67B 2201/08; B67B 3/00; B67C 7/004; B67C 7/0073; B67C 2003/227; B67C 2003/228; B67C 2007/0066; B29C 2049/4697
USPC ......... 53/426, 167, 452, 558, 453, 559, 561, 53/471, 282
See application file for complete search history.

(56) References Cited

U.S. PATENT DOCUMENTS

| 6,298,638 | B1 | 10/2001 | Bettle |
| 7,156,643 | B2 | 1/2007 | Parrinello |
| 9,061,873 | B2 * | 6/2015 | Humele .................. B67B 3/003 |
| 10,137,217 | B2 | 11/2018 | Hayakawa et al. |
| 10,227,224 | B2 * | 3/2019 | Marastoni ............. B67C 7/0073 |

(Continued)

FOREIGN PATENT DOCUMENTS

| CN | 102216199 A | 10/2011 |
| CN | 103566387 A | 2/2014 |
| CN | 104080589 A | 10/2014 |
| CN | 104487378 A | 4/2015 |

(Continued)

OTHER PUBLICATIONS

Extended European Search Report from European patent application 20167955.2, dated Sep. 10, 2020, 11 pages.
Search Report from German Patent Application No. DE 10 2019 108 683.3 dated Dec. 6, 2019 (6 pages).

(Continued)

*Primary Examiner* — Stephen F. Gerrity
(74) *Attorney, Agent, or Firm* — Haynes and Boone, LLP

(57) ABSTRACT

A device for capping a container with a container cap, for example in a beverage filling plant, includes an isolator for providing a defined atmosphere in the interior thereof; a capper for capping a container with a container cap, which capper is arranged in the isolator; and a cap production device for producing container caps from a hot melt, for example a plastics melt. The cap production device is arranged outside the isolator, and is interconnected with the isolator or is connected to the isolator via a cap transport tunnel in order to feed produced container caps to the capper.

17 Claims, 3 Drawing Sheets

(56) References Cited

U.S. PATENT DOCUMENTS

| | | | |
|---|---|---|---|
| 2002/0148201 A1 | 10/2002 | Lees et al. | |
| 2009/0007522 A1* | 1/2009 | Sakai et al. | B65B 55/10 53/426 |
| 2012/0228339 A1 | 9/2012 | Kaneko | |
| 2013/0040009 A1* | 2/2013 | Laumer | B29C 49/42 425/182 |
| 2013/0061557 A1* | 3/2013 | Kitano et al. | B67C 7/0073 53/167 |
| 2014/0318083 A1* | 10/2014 | Marastoni | B67C 7/0073 53/453 |
| 2015/0225098 A1* | 8/2015 | Sollner et al. | B65B 55/10 53/426 |
| 2015/0274330 A1 | 10/2015 | Kaneko | |
| 2017/0312977 A1 | 11/2017 | Pagliarini et al. | |
| 2020/0048064 A1* | 2/2020 | Hayakawa et al. | B67C 3/002 |

FOREIGN PATENT DOCUMENTS

| | | |
|---|---|---|
| CN | 104936762 A | 9/2015 |
| DE | 102008057403 | 5/2010 |
| DE | 202018104454 | 8/2018 |
| EP | 3284578 | 2/2018 |
| GB | 527 879 | 10/1940 |
| WO | WO 1996/018541 | 6/1996 |
| WO | WO 2007/147535 | 12/2007 |
| WO | WO 2014/040694 | 3/2014 |

OTHER PUBLICATIONS

Ohresser et al., "Validation of microbial recovery from hydrogen peroxide-sterilized air", PDA J Pharm Sci Technol. Mar.-Apr. 2004, 58(2):75-80, Abstract, Retrieved from Internet, URL: <https://www.ncbi.nlm.nih.gov/pubmed/15113073>.

* cited by examiner

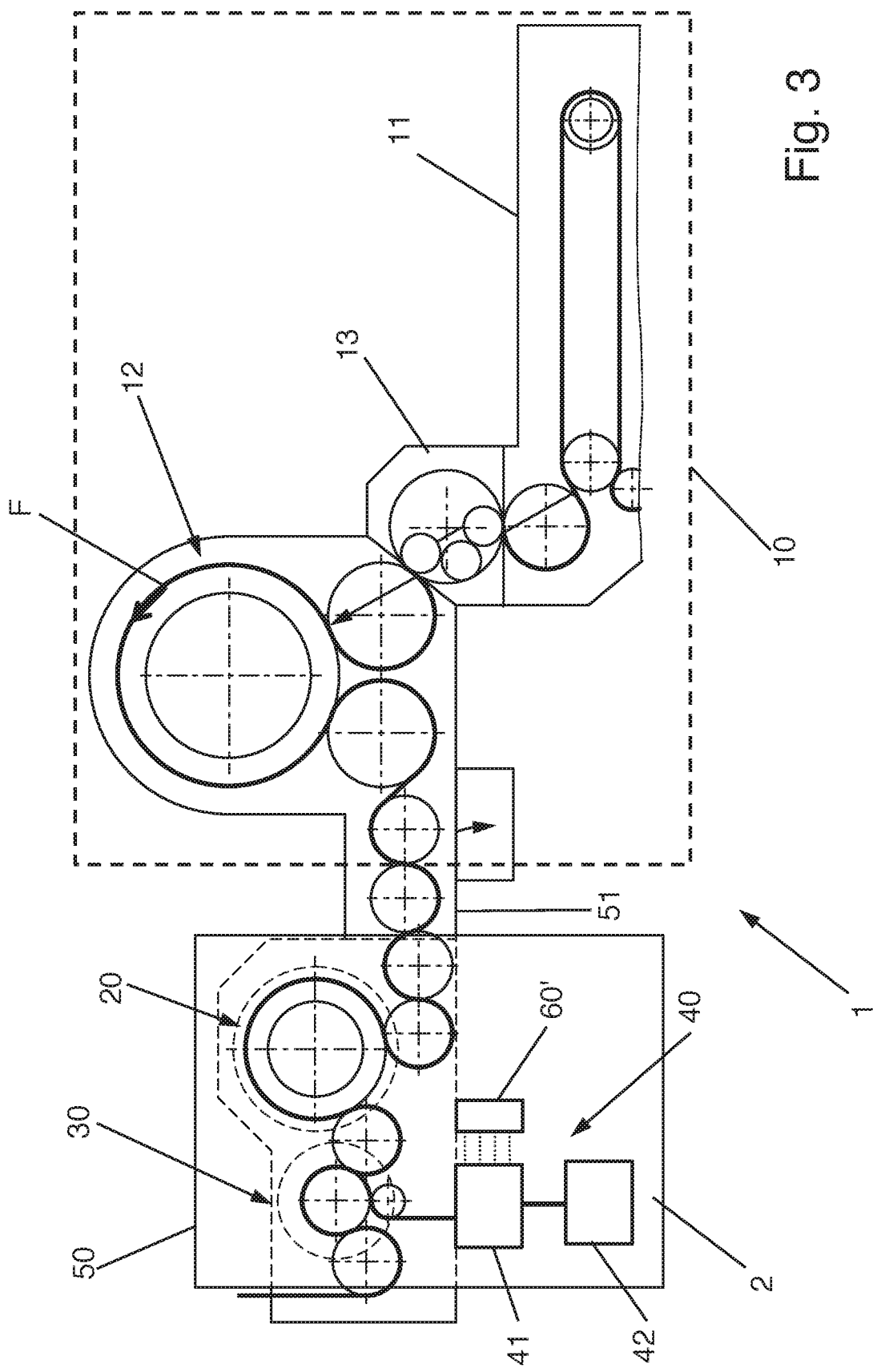

METHOD AND DEVICE FOR CAPPING CONTAINERS WITH CONTAINER CAPS

CROSS REFERENCE TO RELATED APPLICATIONS

This application claims priority from German Patent Application No. DE 10 2019 108 683.3, filed on Apr. 3, 2019 in the German Patent and Trademark Office, the disclosure of which is incorporated herein by reference in its entirety.

BACKGROUND

Technical Field

The present invention relates to a device and a method for capping containers with container caps, for example, in a beverage bottling plant.

Related Art

Certain filling products require essentially sterile bottling in order to ensure product safety and to ensure the shelf life of the bottled filling product. Such sterile bottling, or low-germ or germ-free bottling, and the associated bottling plants are also respectively referred to as "aseptic bottling" and as "aseptic bottling plant."

To make aseptic bottling possible, the handling of containers to be filled, such as, for instance, blow molding, rinsing, transportation, filling and capping, is, depending on the application, done at least in part in cleanrooms, which are also referred to as "isolators." In the cleanrooms, a controlled atmosphere—for example by means of filters and/or the supply of a gas—is provided in order to provide a germ-free or at least sufficiently low-germ and low-particle atmosphere in line with the product-specific requirements in question.

After the caps have been produced, they are conventionally first stored and transported as bulk goods in transport containers. For further processing, the caps must be complicatedly singularized and sorted. Machines required for this purpose are structurally complex and maintenance- and resource-intensive. During the storage, transportation and singularization of the caps, they are exposed to environmental conditions, and this can result in the caps being contaminated. In particular, microbiological germs can settle on the caps, which have to later be complicatedly removed or killed by a sterilization process. A cap sterilizer suitable for this purpose increases the structural complexity of the capping machine and is energy- and cost-intensive. In addition, abrasion between the caps can occur when processing the caps, for instance during sorting and transportation. Such abrasion particles and any other foreign bodies can be carried along and thus get into the container to be filled.

To cap containers under aseptic conditions, it is accordingly known to clean and optionally sterilize the caps before application to the filled containers. After the sterilization step, the caps are applied in the isolator under aseptic conditions to the respective containers to be capped.

SUMMARY

An improved device and an improved method for capping containers with container caps, especially in a beverage bottling plant, are described herein according to various embodiments.

Accordingly, what is proposed is a device for capping a container with a container cap, for example in a beverage bottling plant. The device includes an isolator for providing a defined atmosphere in the interior thereof and also a capper for capping a container with a container cap, which capper is arranged in the isolator. Furthermore, the device includes a cap production device for producing container caps from a hot melt, for example a plastics melt. In addition, the cap production device is arranged outside the isolator and the cap production device is interconnected with the isolator or is connected to the isolator via a cap transport tunnel in order to feed produced container caps to the capper.

Because the container caps are synergetically sterilized by the production process and this state is maintained as a result of the proximity to the isolator (interconnected or cap transport tunnel) or, more precisely, the lack of exposure to pollution, it is not necessary to sterilize the container caps again before the capping of the containers to be capped. The container caps are always clean and germ-free as a result of the proposed arrangement.

Moreover, they do not have to be stored, and any transport means, such as, for instance, transport boxes, are omitted as a result. If the container caps are shaped individually and are produced in a carousel-type device having the same pitch as the capper, they do not have to be singularized and/or sorted and/or aligned again; instead, the produced container caps can be directly fed from the cap production device in the correct alignment and in the correct pitch, the result being that the machine-construction complexity of a beverage bottling plant equipped with the device according to the present disclosure is reduced. It is thus possible to omit means for conveying caps, sorting system(s), sensors, such as, for instance, cameras, etc. A possible cap inspection unit for detecting production defects, contamination, etc., is easily integrable in the cap production device, especially for example, a carousel-type machine.

If the container caps are immediately transferred to a capper for capping containers, the pitch of the capper generally corresponds to the pitch of the cap production device, i.e., the cycle rates match, with the result that the individual container caps can be assigned to a corresponding container and applied thereto without any problems. Similarly, the orientation, i.e., alignment, of the container caps is typically maintained from production up to application.

The raw material is generally heated in the cap production device to form a melt, with especially use of temperatures which do not require an additional sterilization of the raw material and of the container caps produced therefrom. The melt for producing the container caps is thus typically hot to the extent that essentially no microbiological germs (spores and/or vegetative germs) can survive this process, with the result that the container caps are essentially sterile after shaping in the cap shaping unit.

In several embodiments, a device for sterilizing the cap production device is provided that is configured for contacting the cap production device with a sterilizing gas. This encompasses complete and partial contacting of the cap production device, especially a cap shaping unit. Thus, the sterility generated by the production of the container caps can be achieved and maintained in a particularly reliable manner. If there is a cap transport tunnel through which the container caps are transported from the cap shaping unit into the isolator, the sterilizing gas is generally applied to the cap transport tunnel.

In certain embodiments, the device for sterilizing the cap production device includes one or more nozzles which are configured such that they direct a gas stream of the sterilizing gas at least to a section of the cap production device, for example the cap shaping unit. Thus, the sterility of the container caps, generated by the production thereof, is maintained in an effective manner by the killing of any externally infiltrating germs, the result being that the sterile container caps are not contaminated.

In some embodiments, the sterilizing gas includes hydrogen peroxide ($H_2O_2$), for instance in a concentration within the range from 100 ppm to 200 ppm, for example of about 150 ppm. In these concentrations, the gas is noncorrosive and can thus be discharged onto the cap production device without any problems, especially also in an ongoing manner.

In various embodiments, the device for sterilizing the cap production device is configured for contacting the cap production device with the sterilizing gas during the production of the container caps, for example, continuously, the result being that the sterility generated by the production of the container caps can, for example, also be reliably maintained when the cap production device is situated outside an isolator.

In certain embodiments, the device for sterilizing the cap production device is configured for contacting the cap production device with the sterilizing gas outside (in terms of time) the production of the container caps, i.e., for instance before start-up or during an interruption of regular operation. Herein, "regular operation" refers to the operational state of the cap production device, in which said device produces and transports away container caps, for instance to a capper of a beverage bottling plant, as usual. In this embodiment, the cap production device is sterilized outside regular operation and then, during regular operation, typically overlaid with sterile air from an isolator, the result being that it is possible to dispense with an ongoing active contacting by the device for sterilizing the cap production device and thus possible to save energy and resources.

The isolator generally also contains a capper for capping the containers with the container caps. The isolator can include an airlock and an internal pressure of sterile air or clean air and/or a further gas, which internal pressure is increased compared to the external environment, in order to ensure, by means of an outwardly directed air stream, that no contamination can infiltrate the isolator from the outside. By means of the isolator, it is possible to maintain the sterility of the container caps after production without the need for a separate, subsequent sterilization.

In some embodiments, the cap production device is designed as a carousel-type machine. In this case, since the container caps are shaped individually and are, during production, already present in the pitch required by the capper, they can be immediately transported away to a possible capper without having to be singularized and/or sorted again.

A beverage bottling plant which includes a filler for filling containers with a beverage and a device for capping a filled container with a container cap according to any of the above-described variants is also encompassed in the present disclosure.

The technical effects, advantages and embodiments which were described above in relation to the device for producing and sterilizing container caps apply mutatis mutandis to the beverage bottling plant.

Thus, as a result of the sterilization of the cap production device, it is possible for the above reasons to reduce the machine-construction complexity of the beverage bottling plant. It is possible to omit means for conveying caps, sorting system(s), sensors, such as, for instance, cameras, etc.

The cap production device can be sterilized outside regular operation and then, during regular operation, overlaid with sterile air from the isolator, the result being that it is possible to dispense with an ongoing active contacting by the device for sterilizing the cap production device and thus possible to save energy and resources.

A method which is configured for capping containers to be capped with a container cap according to various embodiments is also described herein. The method includes: generating a germ-free or low-germ atmosphere in a cleanroom of an isolator; producing container caps from a hot melt, for example, plastics melt, in a cap shaping unit of a cap production device, the cap shaping unit being arranged outside the isolator and being interconnected therewith or connected thereto via a cap transport tunnel for transport of the container caps into the isolator; and transporting the container caps into the isolator.

The technical effects, advantages and embodiments which were described above in relation to the device for producing and sterilizing container caps and in relation to the beverage bottling plant apply mutatis mutandis to the method.

Thus, the method furthermore includes sterilizing the cap production device by contacting of at least one part thereof with a sterilizing gas, the result being that the sterility generated by the production of the container caps can be achieved and maintained in a particularly reliable manner. If there is a cap transport tunnel through which the container caps are transported from the cap shaping unit into the isolator, the sterilizing gas is generally applied to the cap transport tunnel.

In several embodiments, the sterilizing gas includes $H_2O_2$, for instance in a concentration within the range from 100 ppm to 200 ppm, for example of about 150 ppm. In these concentrations, the gas is noncorrosive and can thus be discharged onto the cap production device without any problems, especially also in an ongoing manner.

In some embodiments, the cap production device is contacted with the sterilizing gas during the production of the container caps, generally continuously. Alternatively or additionally, the cap production device can, for the reasons mentioned above, be contacted with the sterilizing gas outside (in terms of time) the production of the container caps.

In various embodiments, the produced container caps are transported to a capper for capping containers with the container caps. According to an exemplary embodiment, said container caps do not pass through a sorting system and/or a device for sterilizing the container caps and/or a singularization device, since this can be omitted in the case of the synergetic sterilization due to the production process and maintenance of the sterility of the container caps due to the sterilization of the cap production device, especially when said device is designed as a carousel-type machine.

Further advantages and features of the present invention are apparent from the following description of exemplary embodiments. The features described therein can be implemented alone or in combination with one or more of the features stated above, if the features are not contradictory. The following description of exemplary embodiments is given with reference to the accompanying drawings.

BRIEF DESCRIPTION OF THE FIGURES

Further embodiments of the invention are more particularly elucidated by the following description of the figures.

FIG. 3 is a schematic representation of a plant for producing, filling and capping containers according to a further exemplary embodiment.

DETAILED DESCRIPTION

Exemplary embodiments are described below on the basis of the figures. In said figures, elements which are the same, are similar or act in the same way are provided with identical reference signs, and a repeated description of said elements is partially dispensed with in order to avoid redundancies.

Figure 1:
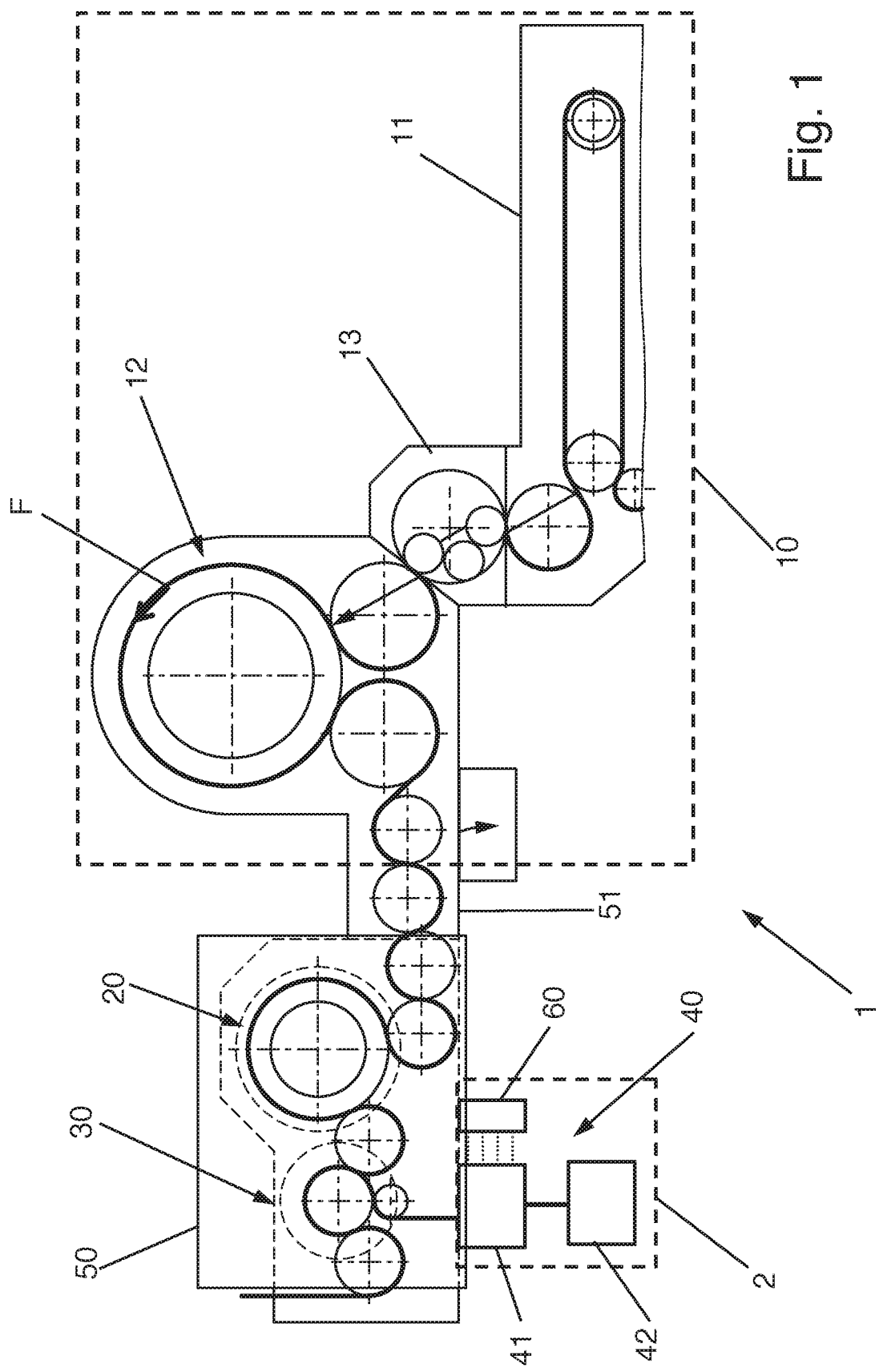
FIG. 1 is a schematic representation of a plant for producing, filling and capping containers.
Figure 2:
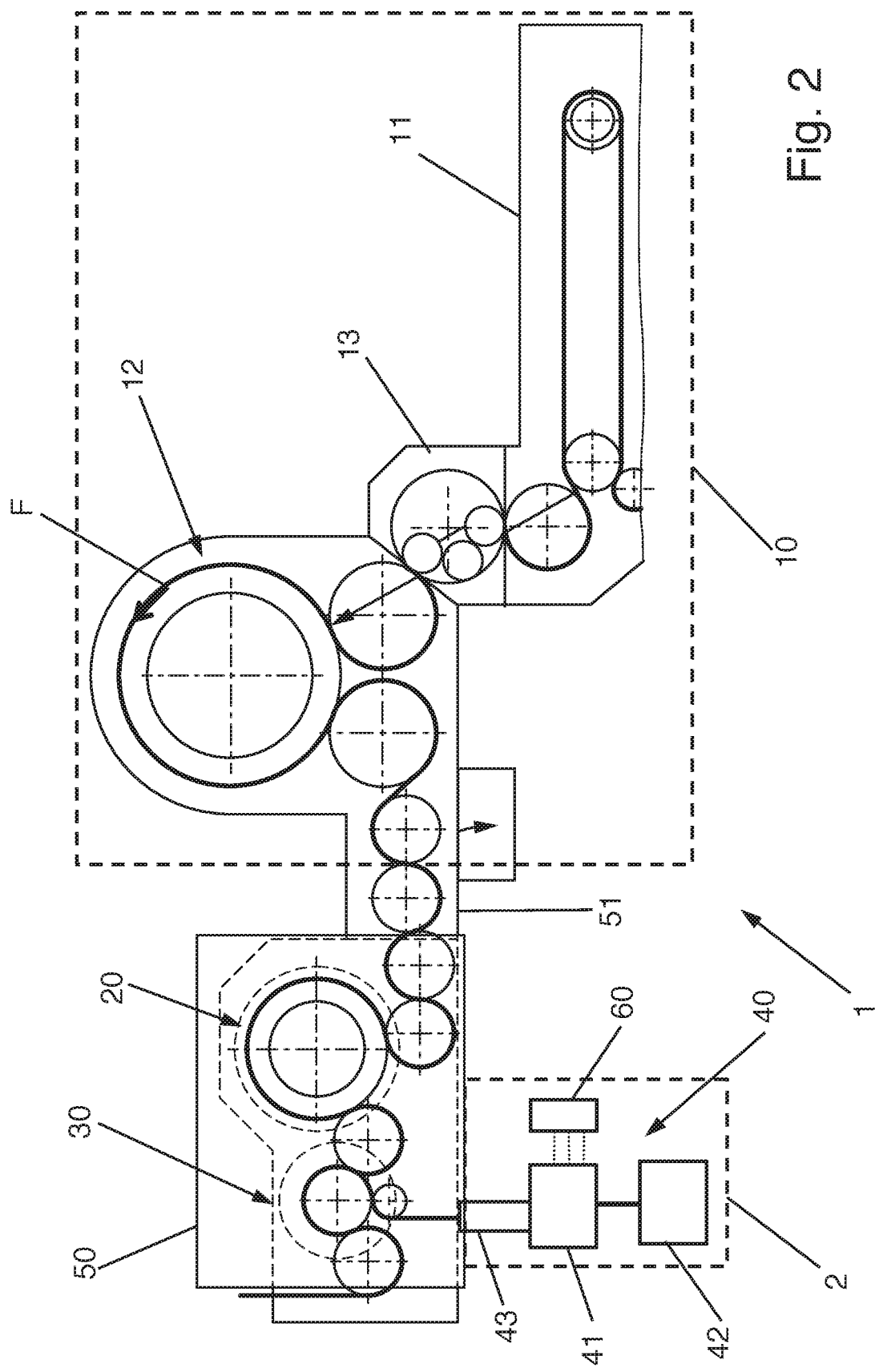
FIG. 2 is a schematic representation of a plant for producing, filling and capping containers according to a further exemplary embodiment.

FIGS. 1 to 3 are schematic representations of a beverage bottling plant 1, especially a plant for producing, filling and capping containers, according to various exemplary embodiments.

The beverage bottling plant 1 includes: a device 10 for producing containers, also referred to herein as "container production device"; a device 20 for filling the containers, also referred to herein as "filler"; a device 30 for capping containers with container caps, also referred to herein as "capper"; and a device 40 for producing container caps, also referred to herein as "cap production device".

The beverage bottling plant 1 thus includes multiple stations which are passed through successively from the production of the containers, via the filling of same, up to the capping of same. For this purpose, the containers or the preforms thereof (a preliminary stage of the containers before blow molding or stretch blow molding) are transported along a conveyance path F by being transported by transport star wheels and accordingly transferred from one transport star wheel to the next. Preforms, containers, container caps and holders/clamps provided for this purpose on the transport star wheels are not depicted in FIGS. 1 to 3 for the sake of clarity. The transport star wheels can serve solely for conveyance or can be equipped with handling units in accordance with the stations.

It should be pointed out that the stations shown herein are only exemplary. For instance, the beverage bottling plant 1 can be equipped with further or alternative processing stations, such as, for instance, a labeling device, a cleaning device, etc. Similarly, it is possible to omit stations, such as, for instance, the container production device 10 if the containers are already delivered in the final form to be filled.

The container production device 10 includes a unit 11 for preparing and preheating the preforms. The preforms thus prepared are transferred to a blowing unit 12, in which the heated preforms are expanded by blowing or stretch blowing to form the containers to be filled. For this purpose, the preforms are contacted with a gas under pressure in blow molds, the cavity contour of which corresponds to the intended outer container shape, and also stretched with a stretch rod in the case of stretch blowing in order to inflate the preforms to form containers.

A sterilization unit 13 which is configured for sterilizing the preforms can be situated between the unit 11 and the blowing unit 12. The sterilization unit 13 can, for example, use electron radiation, UV radiation and/or a sterilizing gas for this purpose. It should be pointed out that the sterilization unit 13 can also be arranged after the blowing unit 12 in conveyance direction F or else can be completely omitted if the preforms are already sufficiently sterile owing to the heat required for producing the containers and also remain this way on the path to further handling.

Following the blowing unit 12, the containers enter an isolator 50, in which a controlled atmosphere is present and which is, for example, configured as a cleanroom including sterile air so that the following operational steps can be carried out in a clean, germ-free or at least low-germ atmosphere. The isolator 50 can include an airlock 51, through which the containers to be filled enter the isolator 50, and an internal pressure which is increased compared to the external environment in order to ensure, by means of an outwardly directed gas or air stream, that no contamination can infiltrate the isolator 50 from the outside.

In the exemplary embodiments shown here, the filler 20 and the capper 30 are situated in the isolator 50. However, it is, for example, also possible to arrange one or more units of the container production device 10 in the isolator 50.

Following blow molding and after entry into the isolator 50, the containers are filled with a filling product, for example a beverage, by means of the filler 20. Here, the filling product is similarly generally sterile. Accordingly, what takes place is an aseptic filling of the containers to be filled.

Thereafter, the containers are capped in the capper 30. For this purpose, the filled containers are transported to the capper 30 via one or more transport star wheels within the isolator 50.

At the same time, in an operational track independent thereof, container caps are produced in the cap production device 40 and transported to the capper 30.

The cap production device 40 produces container caps from, for example, a hot plastics melt. What can be provided for this purpose is a cap shaping unit 41, in which container caps are produced from the hot plastics melt by, for example, injection molding. The cap shaping unit 41 is generally designed as a carousel-type machine which can demold container caps as they are required by the capper 30 in an identical cycle or with the same pitch.

The cap shaping unit 41 obtains the raw material from a plastics reservoir 42, which can be part of the cap production device 40, as shown in FIGS. 1 to 3, or a separate unit. The raw material is, for example, heated in an extruder to form a melt, with use of temperatures which do not require an additional sterilization of the raw material and of the container caps produced therefrom.

In some embodiments, the cap production device 40 is directly interconnected with the capper 30, i.e., directly connected thereto, as shown in FIG. 1, with the result that the container caps can be transferred to the capper 30 without a substantial transport path.

Alternatively, the shaped container caps are transported to the capper 30 through a cap transport tunnel 43, as shown in FIG. 2. In several embodiments, a controlled atmosphere is likewise provided in the cap transport tunnel 43. The controlled atmosphere, for example a sterile atmosphere, in the interior of the cap transport tunnel 43 can be achieved by said interior being in contact with the isolator 50 or else being part of the isolator 50, with the result that the controlled atmosphere of the isolator 50 also extends to the cap transport tunnel 43.

The melt for producing the container caps is hot to the extent that essentially no microbiological germs (e.g., spores or vegetative germs) can survive this process, with the result that the container caps are essentially sterile after shaping in the cap shaping unit 41.

The container caps thus synergetically sterilized by the production thereof continue to remain sterile as a result of the direct transfer into the controlled atmosphere of the isolator 50. In other words, as a result of the interconnection or connection via the cap transport tunnel 43, there is no contacting of the sterile-produced container caps with germs or other contamination and pollution. On the contrary, the produced container caps can be directly applied to the containers to be capped.

Further securing of the sterility of the container caps can be achieved by completely or at least partially contacting the cap production device 40, but especially the cap shaping unit 41, with a sterilizing gas (e.g., $H_2O_2$ in a concentration of about 150 ppm). A sterilizing gas within the range of such concentrations is noncorrosive and can be discharged onto the cap production device 40 in an ongoing manner.

For this purpose, the beverage bottling plant 1 as per the exemplary embodiments in FIGS. 1 and 2 includes a device 60 for sterilizing the cap production device, which is also referred to herein as "cap-production sterilization device." The cap-production sterilization device 60 includes a sterile gas applicator which is supplied with sterilizing gas and includes one or more nozzles, and which is directed to the cap production device 40 and especially the cap shaping unit 41 such that the sterility of the container caps, generated by the production thereof, is maintained.

Any germs which infiltrate the cap production device 40 from the outside are killed as a result, and the sterile container caps are not contaminated.

The transport route of the container caps from the cap shaping unit 41 to the capper 30 can also be contacted with sterilizing gas from the cap-production sterilization device 60. As a result, said transport route can also be kept sterile and any germs which infiltrate said transport route can be killed.

According to this exemplary embodiment, the contacting of the cap production device 40, which takes place continuously for example, is done during the production of the container caps, especially during the regular operation of the beverage bottling plant 1. Alternatively, contacting of the cap production device 40 and the transport route with the sterilizing gas can also take place before the regular operation of the beverage bottling plant 1 and/or in operational breaks.

The group of structures that include the cap production device 40 and the cap-production sterilization device 60 is referred to herein as "device for producing and sterilizing container caps" and provided with reference sign 2.

According to a further exemplary embodiment depicted in FIG. 3, the cap production device 40, especially the cap shaping unit 41, is sterilized prior to production, i.e., before start-up, and subsequently overlaid with sterile air from an isolator during the regular operation of the beverage bottling plant 1. For this purpose, the cap production device 40 can be situated in the isolator 50 (cf. FIG. 3) or in a separate isolator interconnected therewith.

The sterilization of the cap production device 40 outside, in terms of time, regular operation is done by means of a cap-production sterilization device 60', which is, for example, arranged in the isolator 50. However, in this case, the cap production device 40 and the cap-production sterilization device 60' are situated in one housing in order to prevent the sterilizing gas from reaching the container caps or getting into the containers still open.

If the cap-production sterilization device is arranged in an isolator, this is referred to herein as "internal cap-production sterilization device" 60', otherwise it is referred to as "external cap-production sterilization device" 60.

In contrast to the embodiments in FIGS. 1 and 2, there is thus no need, in the embodiment in FIG. 3, for specific contacting of the cap production device 40 with a sterilizing gas during the regular operation of the beverage bottling plant 1. On the contrary, the sterilization is brought forward, i.e., before start-up, or carried out during an interruption of regular operation and maintained during operation by the atmosphere in the isolator 50.

Because the container caps are synergetically sterilized by the production process and this sterile state is maintained until the application of same to the containers to be capped, with support by for example the cap-production sterilization device 60, 60', it is not necessary to sterilize the container caps again before the application by the capper 30. The container caps are always clean and germ-free. Moreover, they do not have to be stored, and any transport means, such as, for instance, transport boxes, and the handling thereof are omitted as a result.

Since the container caps are shaped individually, they can already be spaced during production, especially in a carousel-type machine, and immediately transported to the capper 30. As a result, the container caps do not have to be singularized and/or sorted again, the result being that the machine-construction complexity of the beverage bottling plant 1 is reduced. It is thus possible to omit means for conveying caps, sorting system(s), sensors, such as, for instance, cameras, etc. A possible cap inspection unit for detecting production defects, contamination, etc., is easily integrable in the cap production device 40, especially a carousel-type machine.

If the container caps are transferred to the capper 30, the pitch of the capper generally corresponds to the pitch of the cap production device 40. In other words, the cycle rates generally match such that the individual container caps can be assigned to a corresponding container and applied thereto without any problems. Similarly, the orientation, i.e., alignment, of the container caps is typically maintained from production up to application.

Where applicable, all the individual features described in the exemplary embodiments can be combined with one another and/or replaced by one another without departing from the scope of the invention.

What is claimed is:

1. A device for capping a container with a container cap comprising:
   an isolator configured to provide a controlled atmosphere in an interior of the isolator;
   a capper disposed in the isolator and configured to cap the container with the container cap;
   a cap production device:
      disposed outside of the isolator,
      interconnected with the isolator or connected to the isolator via a cap transport tunnel; and
      configured to produce container caps from a melt and to feed produced container caps to the capper; and
   a device configured to sterilize the cap production device with a sterilizing gas comprising one or more nozzles configured to direct a gas stream of the sterilizing gas to at least a section of the cap production device, and further configured to contact the cap production device with the sterilizing gas during production of the container caps.

2. The device of claim 1, wherein the device configured to sterilize the cap production device is further configured to provide hydrogen peroxide ($H_2O_2$) at a concentration of from 100 ppm to 200 ppm.

3. The device of claim 1, further comprising a filler disposed in the isolator and configured to fill the container with a filling product.

4. The device of claim 1, wherein the cap production device comprises a carousel-type machine.

5. The device of claim 1, wherein the at least a section of the cap production device comprises a cap shaping unit.

6. A beverage bottling plant comprising:
a filler configured to fill containers with a beverage; and
the device of claim 1.

7. The beverage bottling plant of claim 6, wherein the filler is disposed in the isolator.

8. The beverage bottling plant of claim 6, wherein a pitch of the cap production device corresponds to a pitch of the capper.

9. A method for capping a container with a container cap, comprising:
generating a controlled atmosphere in an interior of an isolator;
producing, in a cap production device, container caps from a melt, wherein the cap production device is disposed outside the isolator, and is interconnected with the isolator or connected to the isolator via a cap transport tunnel;
sterilizing the cap production device, via one or more nozzles configured to direct a gas stream of a sterilizing gas to at least a section of the cap production device, by contacting at least one part of the cap production device with the sterilizing gas, wherein the at least one part of the cap production device is contacted with the sterilizing gas during production of the container caps; and
transporting the container caps to a capper disposed in the isolator.

10. The method of claim 9, wherein the sterilizing gas comprises hydrogen peroxide ($H_2O_2$).

11. The method of claim 10, further comprising providing the $H_2O_2$ at a concentration of 100 ppm to 200 ppm.

12. The method of claim 9, wherein the produced container caps are transported to the capper without passing through a sorting system and/or a device configured to sterilize the produced container caps.

13. The method of claim 9, wherein the at least one part of the cap production device comprises a cap shaping unit.

14. A method for capping a container with a container cap, comprising:
generating a controlled atmosphere in an interior of an isolator;
producing, in a cap production device, container caps from a melt, wherein the cap production device is disposed outside the isolator, and is connected to the isolator via a cap transport tunnel;
sterilizing the cap production device, via one or more nozzles configured to direct a gas stream of a sterilizing gas to at least a section of the cap production device, by contacting at least one part of the cap production device with the sterilizing gas, wherein the at least one part of the cap production device is contacted with the sterilizing gas during production of the container caps;
transporting the container caps to a capper disposed in the isolator; and
applying the sterilizing gas to the cap transport tunnel.

15. The method of claim 14, wherein the sterilizing gas comprises hydrogen peroxide ($H_2O_2$).

16. The method of claim 14, wherein the produced container caps are transported to the capper without passing through a sorting system and/or a device configured to sterilize the produced container caps.

17. The method of claim 14, wherein the at least one part of the cap production device comprises a cap shaping unit.

* * * * *